UNITED STATES PATENT OFFICE.

JOHN F. PERRY, OF CHICAGO, ILLINOIS.

ROOFING COMPOSITION.

SPECIFICATION forming part of Letters Patent No. 294,665, dated March 4, 1884.

Application filed April 4, 1883. (No specimens.)

*To all whom it may concern:*

Be it known that I, JOHN F. PERRY, of Chicago, in the county of Cook and State of Illinois, have invented certain new and useful Improvements in Roofing Compositions; and I do hereby declare the following to be a full, clear, and exact description of the invention, such as will enable others skilled in the art to which it pertains to make and use it.

My invention relates to an improvement in soapstone roofing compositions; and it consists in the combination of pulverized soapstone, slate, rosin, Venetian red, and crude oil, in or about the proportions which will be more fully described hereinafter.

The object of my invention is to provide a fire-proof roofing compound that is impervious to frost or water, and which is not affected by the sun's heat.

In making my compound I take pulverized soapstone, thirty-five per cent.; pulverized slate, twenty per cent.; pulverized rosin, twenty-five per cent.; Venetian red, ten per cent., and crude oil, ten per cent.

In the preparation of this composition I use a double kettle. The ingredients are placed in the inner kettle, and the space between the inner and outer kettle is filled with water. As the ingredients are heated only by the boiling water, there is no danger of the composition being burned while undergoing this process. This double kettle is a very essential feature in the successful manufacture of the composition. The rosin and oil are first placed in the inner kettle and allowed to boil from three to five minutes. I then add the pulverized soapstone, slate, and Venetian red in the proportions above given and stir the entire mass until thoroughly mixed. When this is done the composition is ready to be applied to the felting.

I am aware that compositions compounded of steatite, rosin, and oil are not broadly new. I do not therefore claim such a composition; but I do claim that by the use of the ingredients hereinbefore set forth in the specified proportions a paint is procured which combines the advantages of other roofing compositions, and is at the same time less costly and more effective.

What I claim is—

The within-described fire-proof roofing-paint, which consists, essentially, of soapstone, thirty-five per cent.; slate, twenty per cent., and crude oil ten per cent., mixed and treated substantially in the manner set forth.

In testimony whereof I affix my signature in presence of two witnesses.

JOHN F. PERRY.

Witnesses:
EZRA L. BRAINERD,
WILLIAM H. McGUIRE.